(12) United States Patent
Cox

(10) Patent No.: US 9,281,675 B2
(45) Date of Patent: Mar. 8, 2016

(54) SYSTEMS AND METHODS FOR CABLE DEPLOYMENT OF DOWNHOLE EQUIPMENT

(71) Applicant: Don C. Cox, Southlake, TX (US)

(72) Inventor: Don C. Cox, Southlake, TX (US)

(73) Assignee: Baker Hughes Incorporated, Houston, TX (US)

( * ) Notice: Subject to any disclaimer, the term of this patent is extended or adjusted under 35 U.S.C. 154(b) by 433 days.

(21) Appl. No.: 13/707,040

(22) Filed: Dec. 6, 2012

(65) Prior Publication Data

US 2014/0158379 A1    Jun. 12, 2014

(51) Int. Cl.
*H02G 9/06* (2006.01)
*H02G 1/08* (2006.01)
*E21B 43/12* (2006.01)
*E21B 17/02* (2006.01)

(52) U.S. Cl.
CPC ............... *H02G 9/06* (2013.01); *E21B 17/023* (2013.01); *E21B 43/128* (2013.01); *H02G 1/08* (2013.01)

(58) Field of Classification Search
CPC combination set(s) only.
See application file for complete search history.

(56) References Cited

U.S. PATENT DOCUMENTS

| | | | |
|---|---|---|---|
| 4,561,512 A * | 12/1985 | Tramposch | 177/229 |
| 4,743,711 A | 5/1988 | Hoffman | |
| 6,145,597 A | 11/2000 | Kobylinski | |
| 6,596,393 B1 | 7/2003 | Houston | |
| 7,438,971 B2 | 10/2008 | Bryant | |
| 2007/0000682 A1 | 1/2007 | Varkey | |
| 2007/0128351 A1 * | 6/2007 | Nanna et al. | 427/180 |
| 2008/0087466 A1 | 4/2008 | Emerson | |
| 2009/0194296 A1 * | 8/2009 | Gillan et al. | 166/385 |
| 2010/0288493 A1 * | 11/2010 | Fielder et al. | 166/250.15 |
| 2011/0036560 A1 * | 2/2011 | Vail et al. | 166/87.1 |
| 2011/0234421 A1 * | 9/2011 | Smith | 340/854.3 |
| 2012/0024543 A1 | 2/2012 | Head | |

FOREIGN PATENT DOCUMENTS

| | | |
|---|---|---|
| EP | 2204823 | 7/2010 |
| WO | WO-2006054092 | 5/2006 |
| WO | WO-2012-049508 | 4/2012 |

* cited by examiner

*Primary Examiner* — Taras P Bemko
(74) *Attorney, Agent, or Firm* — Law Offices of Mark L. Berrier

(57) ABSTRACT

Systems and methods for cable deployment of downhole equipment, wherein the conductors of a power cable bear the load of the downhole equipment and jewelry, as well as the cable itself. The power cable includes a set of elongated conductors, an upper coupling and a lower coupling. The upper support coupling suspends each of the conductors from the support structure and electrically couples the conductors to a power source. The lower coupling suspends the downhole electrical equipment from the conductors and electrically couples the conductors to the downhole equipment. One embodiment uses 7075 T-6 aluminum conductors to provide a length of at least 10,000 feet, a yield stress of at least 50,000 psi and a resistance of less than 0.2 ohm/kf. The aluminum conductors are homogeneous and are non-reactive with hydrogen sulfide, so no lead sheathing is required.

20 Claims, 3 Drawing Sheets

SYSTEMS AND METHODS FOR CABLE DEPLOYMENT OF DOWNHOLE EQUIPMENT

BACKGROUND

1. Field of the Invention

The invention relates generally to oil production, and more particularly to systems and methods for cable-deployment of downhole equipment such as electric submersible pumps (ESP's).

2. Related Art

Oil is typically extracted from geological formations through the wells that extend far below the earth's surface. Often, the naturally existing pressure in the wells is insufficient to force the oil out of the wells. In this case, artificial lift systems such as ESP's are used to extract the oil from the wells. ESP's are also commonly utilized when operators want to increase the flow rate of the fluid being extracted, such as when the water cut (percentage of water versus oil) increases.

An ESP system includes a pump and a motor that are lowered into a producing region of the well. Typically, the pump is connected to a conduit (e.g., a tubing string) through which oil is pumped to the surface. This conduit is normally used to lower the ESP system into the well, and to retrieve the ESP from the well. A power source at the surface of the well is connected to the ESP motor via a power cable that is connected to the conduit. For example, the power cable may be banded to the exterior of the conduit. The power cable in this type of system normally does not bear any of the weight of the ESP. It should be noted that the term "load" is used herein to refer to weight.

Sometimes a well operator wishes to use a cable-deployed ESP system. Conventional cables, however, typically are not designed to support the weight of such a system, and do not normally have the tensile strength to support even their own weight in lengths over about 1000 feet. While cables have been designed to support the weight of a cable-deployed ESP system (including the ESP and the cable itself), their use in the hostile downhole environment has resulted in various problems that render these cables impractical or ineffective.

Conventional power cables for downhole equipment use annealed copper conductors to convey electrical power from the power source to the downhole equipment. While copper has excellent electrical conductivity, it has very low tensile yield strength. As a result, most prior art cables that have been designed for cable-deployed systems have relied on load-bearing structures within the cables that are separate from the electrical conductors.

For example, in one type of cable, several layers of steel wires are helically wound around a set of conventionally constructed conductors (typically insulated copper). The steel wires provide the load-bearing capability which allows the cable to support itself and the downhole equipment, while the conductors provide the capability to convey electrical power to the downhole equipment. When this type of cable is used, the helically wound steel wires have a tendency to shift along the length of the cable and bunch up. This is sometimes referred to as "bird-nesting". The bunching of the load-bearing wires is exacerbated by changes in the temperature and tension along the cable, and it may be very difficult to deploy the cable in the well or retrieve the cable from the well without causing the bunching of the load-bearing wires. Moreover, the resulting bunching of the wires impedes deployment and retrieval of the cable and corresponding downhole equipment.

Another type of prior art cable that was designed to be load bearing employs two wire (e.g., steel) ropes to support the weight of the cable and downhole equipment. In this type of cable, conventional conductors (e.g., copper conductors covered by layers of insulation) are used to carry electrical power to the downhole equipment. The wire support ropes are positioned on opposite sides of the conductors, and the wire ropes and conductors are then "sandwiched" between molded plastic blocks. An outer armor wrap is then provided around this assembly. One of the most significant problems that arises with this type of cable is that the conductors tend to push through the insulation and sheathing when run into the well using an injector apparatus. The injector creates enormous lateral forces on the cable, which may in turn cause the conductors to be pushed through the insulation and sheathing, compromising the electrical integrity of the cable. As with the previously described cable, the tensile stresses on the cable and the temperature changes within the downhole environment can cause the different components of the cable to move relative to each other, which can lead to failure of the cable.

SUMMARY OF THE INVENTION

Because the use of separate conductive and load-bearing elements in the prior art has resulted in problems with the physical and electrical integrity of the cable, the present systems and methods utilize conductive elements that are also capable of bearing the load of a cable-deployed system (including the cable and the downhole equipment). Rather than using materials that have either good conductivity and poor load-bearing characteristics (e.g., annealed copper), or poor conductivity and good load-bearing characteristics (e.g., steel), the present systems and methods use materials that have moderately good conductivity and load-bearing characteristics (e.g., aluminum alloys). These materials are used to form conductors that have both adequate power transmission characteristics and sufficient load-bearing capabilities.

One embodiment comprises a system for cable deployment of downhole equipment such as an ESP, including a support structure positioned at the surface of a well, a piece of downhole electrical equipment, and a power cable coupling the piece of downhole electrical equipment to the support structure. The power cable includes a set of elongated conductors that are electrically coupled to the piece of downhole electrical equipment so that they carry power from a power source at the surface of the well to the piece of downhole electrical equipment. The cable also includes an upper support coupling connected to an upper end of each of the conductors, and a lower equipment coupling connected to a lower end of each of the conductors. The upper support coupling suspends each of the conductors from the support structure. The lower equipment coupling suspends the piece of downhole electrical equipment from the plurality of conductors. The conductors thereby transfer the physical load of the piece of downhole equipment, as well as the physical load of the cable itself, to the support structure.

In one embodiment, the cable has a length of at least 10,000 feet, a yield stress of at least 50,000 psi and a resistance of no more than 0.2 ohms per 1000 feet at 68 F. The conductors in this embodiment may be made of, for instance, 7075 T-6 aluminum. The aluminum in these conductors is homogeneous and is not combined with any other metals to enhance its properties (e.g., with steel to improve its strength, or with copper to improve its conductivity). Further, the conductors are not sheathed with lead, because the aluminum is non-reactive with hydrogen sulfide.

Another embodiment comprises an electrical power cable for deploying downhole equipment. This embodiment includes the conductors and electrical and mechanical couplings, but does not include the downhole equipment itself, or the support structure from which the cable is suspended in the well. Each of the plurality of elongated conductors has an upper end and a lower end. An upper coupling is secured to the upper end of each of the plurality of conductors. The upper coupling enables the conductors to be electrically coupled to a power source and mechanically coupled to a support structure at the surface of a well. A lower coupling secured to the lower end of each of the plurality of conductors. The lower coupling enables the conductors to be electrically coupled to a piece of downhole equipment, both electrically and mechanically, thereby providing power to the downhole equipment and suspending the downhole equipment in the well.

Yet another embodiment comprises a method for cable deployment of downhole equipment. In this method, a power cable that has a plurality of electrical conductors is provided. The conductors have sufficient tensile strength to support the weight of the cable itself and the downhole equipment from a support structure at the surface of the well. The conductors also have sufficient conductivity to provide power to the downhole equipment and thereby drive the equipment. The conductors are then electrically and mechanically coupled at the lower end of the cable to the downhole equipment. The downhole equipment is then suspended from the electrical conductors as it is lowered into the well. The electrical conductors are secured at an upper end of the power cable to the support structure at the surface of the well.

Numerous other embodiments are also possible.

BRIEF DESCRIPTION OF THE DRAWINGS

Other objects and advantages of the invention may become apparent upon reading the following detailed description and upon reference to the accompanying drawings.

Figure 1:
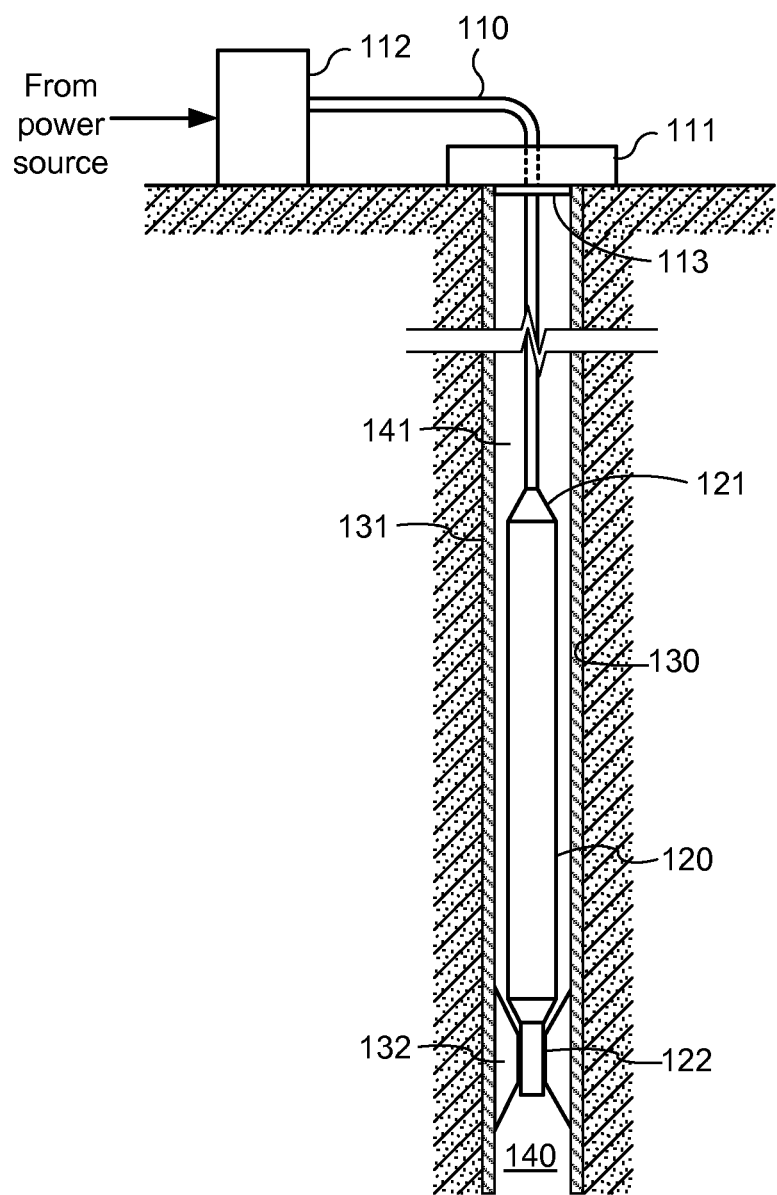
FIG. 1 is a diagram illustrating an exemplary artificial lift system in accordance with one embodiment.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as defined by the appended claims. Further, the drawings may not be to scale, and may exaggerate one or more components in order to facilitate an understanding of the various features described herein.

DETAILED DESCRIPTION OF EXEMPLARY EMBODIMENTS

One or more embodiments of the invention are described below. It should be noted that these and any other embodiments described below are exemplary and are intended to be illustrative of the invention rather than limiting.

Generally speaking, the present systems and methods are designed to provide cables that have sufficient strength to support their own weight and the weight of downhole equipment such as an ESP system, and also have low enough resistivity to enable the efficient transfer of sufficient power downhole to drive the attached equipment. This is accomplished by selecting a material that has a balance of strength and conductivity, and constructing the conductors of the cable with a sufficiently large diameter to provide the necessary strength and conductivity to suspend and drive the downhole equipment.

Referring to FIG. 1, a diagram illustrating an exemplary artificial lift system in accordance with one embodiment of the present invention is shown. A wellbore 130 is drilled into an oil-bearing geological structure and a casing 131 is installed in the wellbore. The casing may be perforated in a producing zone of the well to allow oil to flow from the formation into the well. In this example, a landing nipple 132 is installed at the lower end of the well. The landing nipple separates a producing zone 140 from a non-producing zone above it.

A cable-deployed ESP 120 is positioned in the wellbore. The ESP is connected to the lower end of a power cable 110 by a lower coupling 121. Power cable 110 couples the ESP to a drive system 112. The drive system receives power from a source such as an external electrical power grid and converts the power to a form that is suitable to drive the ESP. Typically, the drive system is a variable speed drive that provides three-phase power at a variable voltage, and is thereby used to control the speed of the ESP's motor.

Power cable 110 is also configured to suspend the ESP as it is installed into the well or retrieved from the well. A pothead or other type of coupling device (121) provides a means to both electrically couple the leads of the ESP motor to the electrical conductors of the cable and physically secure the ESP to these same conductors. The conductors of the cable thereby bear the load of the ESP when it is suspended in the well. The upper end of the power cable has an upper coupling 113 that is secured to a cable hanger 111, which bears the load of the suspended cable and ESP.

When the ESP is installed in the well, it is suspended by the power cable and lowered into the well. When the ESP reaches landing nipple 132, a stinger 122 on the bottom of the ESP stabs into landing nipple 132, sealing the producing zone below the landing nipple from the upper portion of the well. The drive system can then provide power to the ESP via the cable to drive the ESP's motor. The motor drives the pump, which draws fluid from producing zone 140, through the pump and into the annulus 141 between the ESP/cable and the casing.

It should be noted that the ESP in the system of FIG. 1 is exemplary, and the cable may be used to power and support other types of downhole equipment in other embodiments.

Figure 2:
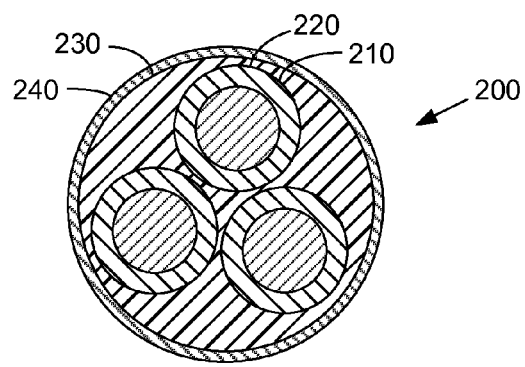
FIG. 2 is a diagram illustrating the cross section of one embodiment of a power cable that is configured for cable-deployment of downhole equipment such as an ESP using the electrical conductors as the load-bearing members of the cable.
Figure 3:
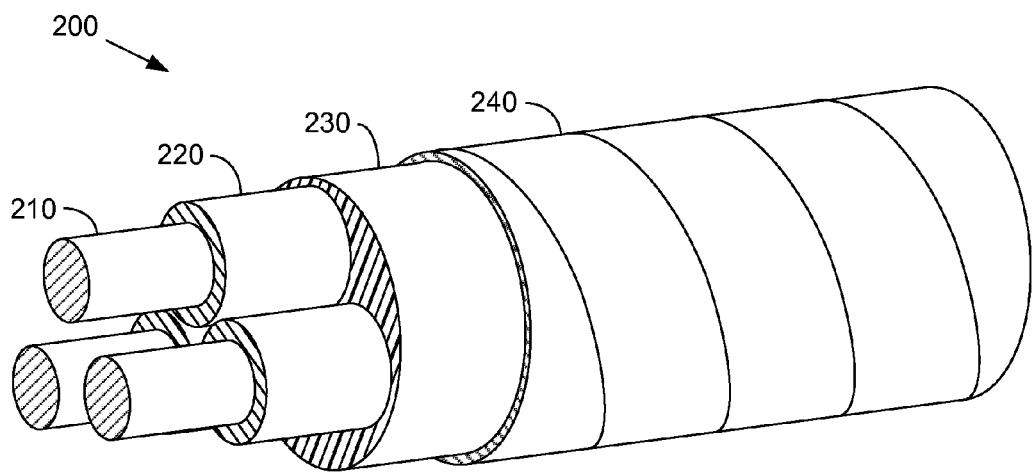
FIG. 3 is a diagram illustrating a partially cut away perspective view of the power cable of FIG. 2.

Referring to FIGS. 2 and 3, one embodiment of a power cable is shown that is configured for cable-deployment of downhole equipment such as an ESP, using the electrical conductors as the load-bearing members of the cable. FIG. 2 is a cross sectional view of the cable, while FIG. 3 is a partially cut away perspective view of the cable.

The embodiment of FIGS. 2 and 3 has a round configuration (i.e., the outer perimeter of the cross section is round). Cable 200 has three conductors 210, each of which is surrounded by a layer of electrical insulation 220. The three insulated conductors are encased in an elastomeric jacket 230. Finally, a layer of protective armor 240 is provided at the exterior of the cable to prevent the conductors and their insulation from being damaged in the well. The layer of armor does not provide any significant load-bearing capability.

Figure 4:
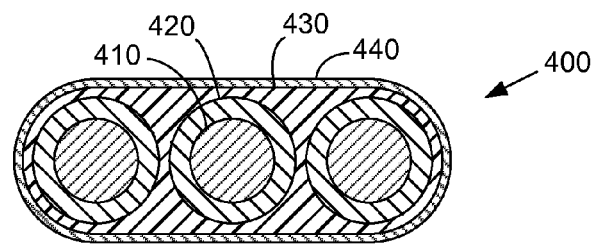
FIG. 4 is a diagram illustrating the cross section of an alternative embodiment of a power cable having load-bearing electrical conductors wherein the conductors are arranged in a flat configuration.

Referring to FIG. 4, an alternative configuration of a cable having load-bearing conductors is shown. In this embodiment, the conductors are arranged in a flat configuration. The basic structure of the cable is the same as that shown in FIGS. 2 and 3. Cable 400 has three conductors 410, each of which is surrounded by a layer of electrical insulation 420. The three insulated conductors are encased in elastomeric jacket 430 (although this may not be the case in other embodiments). Protective armor layer 440 is wrapped around the cable to protect the insulated conductors. Armor layer 440 does not provide any significant load-bearing capability.

The electrical conductors of the present cable must have the strength to carry the tensile load of the system. This includes the weight of the cable itself, including the conductors, the electrical insulation around the conductors, the polymeric jacket, and the outer armor. The load also includes the weight of the ESP or other downhole equipment and any associated tools or equipment (sometimes referred to as "jewelry"). Additionally, the cable must have the reserve strength to free the ESP if it becomes stuck in the well. The tensile stress in the conductors is the sum of all of these loads divided by the cross sectional area of the conductors.

The weight of the conductors is a function of the cable length, cross sectional area and the density of the conductor material. The electrical conductivity is a function of the conductor material's resistivity and cross sectional area. Consequently, if the conductors' diameters are increased to improve their electrical conductivity and tensile strength, their weights are increased as well. If the density of the conductor material is too high, the weights of the conductors severely limit the allowable length of the cable.

As noted above, conventional power cables for downhole equipment use copper conductors. Copper is used because it has good electrical conductivity. A typical conventional cable may use #1 AWG (0.285 inch outer diameter) copper conductors. These conductors have a resistance of approximately 0.13 ohms per thousand feet. This resistance can be obtained using conductors made of 7075-T6 aluminum and having 0.50 inch outer diameters, which insures that an ESP connected to the cable can be supplied with adequate electrical power. The cable itself (having three of these conductors) would weigh 1.60 pound per foot. 7075-T6 aluminum has a tensile yield strength of approximately 73,000 psi, so this cable could deploy a 10,000 pound pump to a depth of 15,200 feet with a safety factor of 1.25 of the conductors' tensile yield strength.

In preferred embodiments, the cable should be capable of supporting its own minimum length of 10,000 feet, plus the weight of the ESP and downhole jewlery weighing 15,000 pounds or so. Electrically, the cable should have as a minimum the same conductivity as #2 AWG copper, (i.e., electrical resistance of 0.1565 ohms per thousand feet at 68 degrees Fahrenheit).

If the 0.50 inch outer diameter conductors were made of steel with the same strength as the 7075-T6 aluminum, the pump could only be deployed to a depth of 8,400 feet because of the increase in cable weight. Further, such steel conductors would only have the electrical conductivity of #7 AWG (0.144 inch outer diameter) copper. These conductors would probably not be able to provide the needed electrical power to the ESP. In order to enable the steel conductors to have the same conductivity as the aluminum conductors, the steel conductors would have to have a diameter of 1.023 inches. The resulting cable would weigh 10.45 pounds per foot, or approximately 6.5 times the weight of the aluminum cable.

It should be noted that there is a type of cable in the prior art that employs conductors which have steel cores and copper cladding (see U.S. Patent App. Pub. No. 20120024543). Even though this type of cable attempts to combine the electrical conductivity of copper with the strength of steel, it suffers from drawbacks similar to those of steel alone. In other words, a steel core that has strength equivalent to that of the aluminum conductor described above is significantly heavier than the aluminum conductor. The copper cladding then adds to this weight, further reducing the depth to which an ESP could be deployed by the cable. In addition to the weight disadvantages of using copper-clad steel as conductors, the cost of manufacturing these conductors is higher than the cost of manufacturing simple homogeneous aluminum conductors.

It should also be noted that there is often hydrogen sulfide present in wells. Hydrogen sulfide can combine with the copper in power cables to produce copper sulfide. Copper sulfide is less conductive and weaker than annealed copper. Additionally, copper sulfide has greater volume than copper alone, so it may cause the insulation or jacket to split. Consequently, when copper is used for the conductors, it is necessary to provide lead shielding around the conductors to protect them from the hydrogen sulfide. The lead shielding adds to the weight of the cable and further reduces the depth to which equipment can be deployed by the cable. Because aluminum is non-reactive with hydrogen sulfide, the lead shielding is not needed when aluminum is used for the conductors. As a result, cables using aluminum conductors are even lighter than their prior art counterparts, which must include this shielding.

The cable-deployed system may be suspended within the well in a variety of ways. The particular mechanism that is used to suspend the system may depend upon a number of factors, including the construction and resulting characteristics of the cable. For example, it may be possible to provide toothed slips that grip the exterior of the cable. These slips would then be held in a slip bowl of a well head hanger. The system may also be held in position within the well by positioning the cable in a tapered socket fitting and pouring molten zinc around the cable. When the zinc solidifies, the cable is secured. An epoxy compound might be used in place of the molten zinc.

Figure 5:
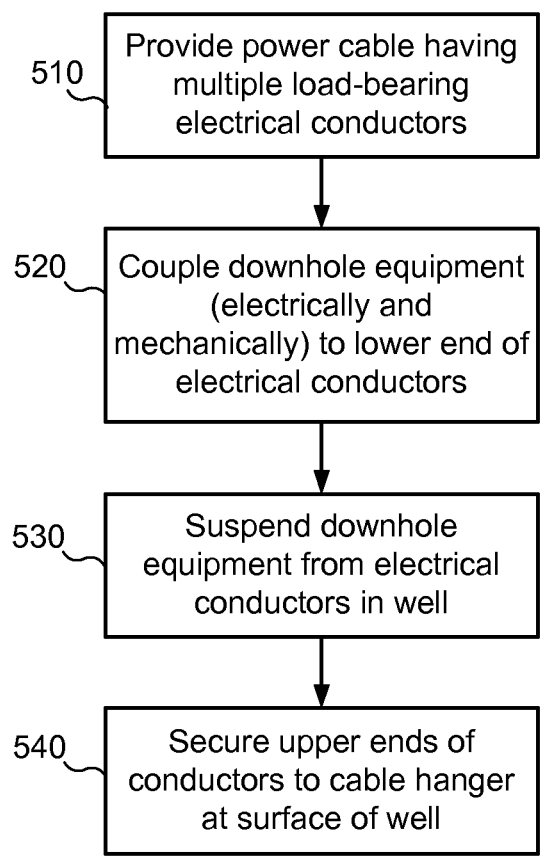
FIG. 5 is a flow diagram illustrating a method for cable-deployment of downhole equipment in accordance with one embodiment.

Alternative embodiments may include methods for cable deployment of downhole equipment such as an ESP. One such embodiment is illustrated in the flow diagram of FIG. 5. In this embodiment, the method begins with providing a power cable that has a plurality of load-bearing electrical conductors (510). The downhole equipment is then electrically and mechanically coupled to the electrical conductors at a lower end of the power cable (520). The downhole equipment is then suspended in a well from the electrical conductors (530). The electrical conductors of the power cable are secured at an upper end of the cable to a cable hanger or other support structure at the surface of the well (540).

As explained above, the electrical conductors of the power cable bear the load of the system, including the weight of the downhole equipment and associated jewelry, as well as the weight of the cable itself. While the other components of the cable may support some very small portion of the load, this portion is well below the portion borne by the electrical conductors. The conductors can conservatively be estimated to transfer at least 90 percent of the load of the system to the support structure As noted above, the embodiments described in detail above are exemplary, and alternative embodiments of the invention may vary from those above in various ways. For example, the power cables may be used to deploy various different types of downhole equipment. Further, while 7075 T-6 aluminum is used in some of the exemplary embodiments because of its favorable properties (e.g., high strength, good conductivity, low density, non-reactive with hydrogen sulfide), other metals or treatments may be used in alternative embodiments. Still further, while the cable embodiments described above have a simple structure comprising the conductors, insulation layers, elastomeric jacket and armor, alternative embodiments may include other components, such as electrical shielding, wire or fabric reinforcement, bonding layers, additional insulation, etc.

It should therefore be understood that the foregoing embodiments are illustrative and that the scope of the invention is not limited to these embodiments. Many additional variations, modifications, additions and improvements to the embodiments described above are possible. It is contemplated that these variations, modifications, additions and improvements fall within the scope of the invention as detailed within the following claims.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

What is claimed is:

1. A system for cable deployment of downhole equipment, the system comprising:
    a support structure positioned at the surface of a well;
    a piece of downhole electrical equipment; and
    an elongated cable coupling the piece of downhole electrical equipment to the support structure;
    wherein the elongated cable includes
        a plurality of weight-bearing conductors,
        one or more layers of insulating or protective material surrounding the weight-bearing conductors,
        an upper support coupling connected to an upper end of each of the weight-bearing conductors, wherein the upper support coupling suspends each of the weight-bearing conductors from the support structure, and
        a lower equipment coupling connected to a lower end of each of the weight-bearing conductors, wherein the lower equipment coupling suspends the piece of downhole electrical equipment from the plurality of weight-bearing conductors,
        wherein the plurality of weight-bearing conductors are electrically coupled to the piece of downhole electrical equipment, wherein power is transmitted through the plurality of weight-bearing conductors to the piece of downhole electrical equipment, and wherein substantially all of the weight of the piece of downhole electrical equipment is transferred from the lower equipment coupling only through the plurality of weight-bearing conductors to the upper support coupling;
    wherein the weight-bearing conductors comprise an aluminum alloy.

2. The system of claim 1, wherein the cable has a length between the upper end and the lower end of at least 10,000 feet.

3. The system of claim 2, wherein each of the plurality of weight-bearing conductors has an outer diameter of at least 0.5 inches, wherein each of the plurality of weight-bearing conductors is surrounded by a layer of electrical insulation, wherein each of the plurality of the insulated weight-bearing conductors is encased in an elastomeric jacket, and wherein the elastomeric jacket is wrapped in a protective armor layer.

4. The system of claim 1, wherein the weight-bearing conductors comprise a single, homogeneous metal.

5. The system of claim 1, wherein the aluminum alloy comprises 7075 T-6 aluminum.

6. The system of claim 1, wherein the weight-bearing conductors comprise a material having a yield stress of at least 50,000 psi and a resistance of no more than 0.2 ohm/kf at 68 F.

7. The system of claim 1, wherein the cable does not have a lead sheath.

8. The system of claim 1, wherein the weight-bearing conductors are non-reactive with hydrogen sulfide.

9. The system of claim 1, wherein the piece of downhole electrical equipment comprises an electric submersible pump.

10. An electrical power cable for deploying downhole equipment, the cable comprising;
    a plurality of elongated weight-bearing conductors, wherein each of the plurality of weight-bearing conductors has an upper end and a lower end;
    one or more layers of insulating or protective material surrounding the weight-bearing conductors;
    an upper coupling secured to the upper end of each of the plurality of weight-bearing conductors, wherein the upper coupling is configured to be connected to a support structure at the surface of a well, and wherein the upper end of each of the plurality of weight-bearing conductors is configured to be electrically coupled to a power source; and
    a lower coupling secured to the lower end of each of the plurality of weight-bearing conductors, wherein the lower coupling is configured to be connected to a piece of downhole equipment, thereby electrically coupling the lower end of each of the plurality of weight-bearing conductors to the piece of downhole equipment;
    wherein the plurality of weight-bearing conductors convey electrical power from the power source to the piece of downhole equipment and wherein substantially all of the weight of the piece of downhole equipment is transferred only through the weight-bearing conductors to the support structure at the surface of the well;
    wherein the weight-bearing conductors comprise an aluminum alloy.

11. The electrical power cable of claim 10, wherein the cable has a length between the upper end and the lower end of at least 10,000 feet.

12. The electrical power cable of claim 11, wherein each of the plurality of weight-bearing conductors has an outer diameter of at least 0.5 inches, wherein each of the plurality of weight-bearing conductors is surrounded by a layer of electrical insulation, wherein each of the plurality of the insulated weight-bearing conductors is encased in an elastomeric jacket, and wherein the elastomeric jacket is wrapped in a protective armor layer.

13. The electrical power cable of claim 10, wherein the weight-bearing conductors comprise a single, homogeneous metal.

14. The electrical power cable of claim 10, wherein the aluminum alloy comprises 7075 T-6 aluminum.

15. The electrical power cable of claim 10, wherein the weight-bearing conductors comprise a material having a yield stress of at least 50,000 psi and a resistance of no more than 0.2 ohm/kf at 68 F.

16. The electrical power cable of claim 10, wherein the cable does not have a lead sheath.

17. The electrical power cable of claim 10, wherein the weight-bearing conductors are non-reactive with hydrogen sulfide.

18. A method for cable deployment of downhole equipment, the method comprising:
   providing a power cable that includes a plurality of weight-bearing electrical conductors and one or more layers of insulating or protective material surrounding the weight-bearing electrical conductors, wherein the weight-bearing conductors comprise an aluminum alloy;
   electrically and mechanically coupling a piece of downhole equipment to the weight-bearing electrical conductors at a lower end of the power cable;
   suspending the piece of downhole equipment from one or more of the plurality of weight-bearing electrical conductors; and
   securing the plurality of weight-bearing electrical conductors at an upper end of the power cable to a support structure at the surface of a well, wherein at least 90 percent of the weight of the downhole equipment is transferred only through the plurality of weight-bearing electrical conductors to the support structure.

19. The method of claim 18, wherein each of the plurality of weight-bearing electrical conductors is non-reactive with hydrogen sulfide, has a yield stress of at least 50,000 psi, and has a resistance of no more than 0.2 ohm/kf at 68 F.

20. The method of claim 19, wherein each of the plurality of weight-bearing electrical conductors has an outer diameter of at least 0.5 inches, wherein each of the plurality of weight-bearing conductors is surrounded by a layer of electrical insulation, wherein each of the plurality of the insulated weight-bearing conductors is encased in an elastomeric jacket, and wherein the elastomeric jacket is wrapped in a protective armor layer.

* * * * *